US008510219B1

(12) United States Patent
Rose

(10) Patent No.: US 8,510,219 B1
(45) Date of Patent: Aug. 13, 2013

(54) BILLING MANAGEMENT PACKAGE FOR INTERNET ACCESS AND WEB PAGE UTILIZATION

(76) Inventor: Edward M. Rose, Cleveland, OH (US)

( * ) Notice: Subject to any disclaimer, the term of this patent is extended or adjusted under 35 U.S.C. 154(b) by 0 days.

(21) Appl. No.: 09/539,688

(22) Filed: Mar. 31, 2000

Related U.S. Application Data

(63) Continuation-in-part of application No. PCT/US99/05777, filed on Mar. 17, 1999.

(51) Int. Cl.
G06Q 40/00 (2012.01)

(52) U.S. Cl.
USPC .................................. 705/40; 705/35; 705/39

(58) Field of Classification Search
USPC .............. 707/104.1; 709/229; 379/133, 112; 395/200; 705/34, 35–40
See application file for complete search history.

(56) References Cited

U.S. PATENT DOCUMENTS

| 4,645,873 A | * | 2/1987 | Chomet | 379/93.12 |
|---|---|---|---|---|
| 4,734,858 A | | 3/1988 | Schlafly | |
| 4,796,297 A | * | 1/1989 | Okamoto | 380/232 |
| 4,868,758 A | * | 9/1989 | Kokubu | 705/400 |
| 4,984,155 A | | 1/1991 | Geier et al. | |
| 5,121,115 A | * | 6/1992 | Andros et al. | 340/7.41 |
| 5,155,680 A | * | 10/1992 | Wiedemer | 705/52 |
| 5,191,611 A | * | 3/1993 | Lang | 705/53 |
| 5,247,575 A | * | 9/1993 | Sprague et al. | 705/53 |
| 5,261,104 A | * | 11/1993 | Bertram et al. | 713/1 |
| 5,388,211 A | * | 2/1995 | Hornbuckle | 717/178 |
| 5,410,598 A | * | 4/1995 | Shear | 705/53 |
| 5,457,747 A | * | 10/1995 | Drexler et al. | 713/186 |
| 5,465,291 A | * | 11/1995 | Barrus et al. | 379/67.1 |
| 5,475,585 A | | 12/1995 | Bush | |
| 5,508,913 A | | 4/1996 | Yamamoto et al. | |
| 5,515,268 A | | 5/1996 | Yoda | |
| 5,528,490 A | | 6/1996 | Hill | |
| 5,537,551 A | * | 7/1996 | Denenberg et al. | 709/247 |
| 5,664,110 A | | 9/1997 | Green et al. | |
| 5,682,325 A | * | 10/1997 | Lightfoot et al. | 709/229 |
| 5,692,132 A | | 11/1997 | Hogan | |
| 5,717,604 A | * | 2/1998 | Wiggins | 709/229 |
| 5,727,163 A | | 3/1998 | Bezos | |

(Continued)

FOREIGN PATENT DOCUMENTS

WO WO 85/02700 6/1985

OTHER PUBLICATIONS

Crocker, David H. (Rev.); *Standard for the Format of ARPA Internet Text Messages*; Aug. 13, 1982; Department of Electrical Engineering; University of Delaware.

(Continued)

*Primary Examiner* — Gregory Johnson
(74) *Attorney, Agent, or Firm* — Renner, Otto, Boisselle & Sklar, LLP

(57) ABSTRACT

A billing management package which handles all web access as charged transactions (Pay-as-you-go) for browsing and purchasing product(s), service(s), and/or data on the Internet. The software is designed to be loaded on an individual web or a web server front ending multiple domains and/or access to other domains through Internet servers. The software deals with access to web pages, content viewing and product selection, billing the user for time spent browsing or per number of pages downloaded, and acting as a broker for multiple product selections. The billing software package is modular, each one handles different time based access transactions used for browsing and/or purchasing on the Internet.

22 Claims, 2 Drawing Sheets

(56) References Cited

U.S. PATENT DOCUMENTS

| | | | | |
|---|---|---|---|---|
| 5,737,414 | A | * | 4/1998 | Walker et al. .................. 705/40 |
| 5,745,681 | A | * | 4/1998 | Levine et al. .................. 709/200 |
| 5,745,884 | A | * | 4/1998 | Carnegie et al. ................ 705/34 |
| 5,749,075 | A | * | 5/1998 | Toader et al. ............. 705/14.19 |
| 5,761,651 | A | * | 6/1998 | Hasebe et al. ................ 705/400 |
| 5,794,221 | A | * | 8/1998 | Egendorf ........................ 705/40 |
| 5,812,670 | A | * | 9/1998 | Micali ............................ 705/74 |
| 5,815,665 | A | * | 9/1998 | Teper et al. .................. 709/229 |
| 5,852,812 | A | * | 12/1998 | Reeder ............................ 705/39 |
| 5,897,621 | A | * | 4/1999 | Boesch et al. ............ 705/26.82 |
| 5,897,622 | A | * | 4/1999 | Blinn et al. ............... 705/26.81 |
| 5,987,430 | A | * | 11/1999 | Van Horne et al. ............ 705/34 |
| 6,032,137 | A | * | 2/2000 | Ballard .......................... 705/75 |
| 6,055,515 | A | * | 4/2000 | Consentino et al. ......... 705/27.1 |
| 6,128,624 | A | * | 10/2000 | Papierniak et al. ........ 707/104.1 |
| 6,145,005 | A | * | 11/2000 | Kirkby .......................... 709/228 |
| 6,195,697 | B1 | * | 2/2001 | Bowman-Amuah .......... 709/224 |
| 6,249,817 | B1 | * | 6/2001 | Nakabayashi et al. ........ 709/224 |
| 6,275,934 | B1 | * | 8/2001 | Novicov et al. ............... 713/168 |
| 6,374,402 | B1 | * | 4/2002 | Schmeidler et al. .......... 717/167 |
| 6,385,592 | B1 | * | 5/2002 | Angles et al. ............. 705/14.56 |
| 6,470,269 | B1 | * | 10/2002 | Adar et al. .................... 709/219 |
| 6,535,294 | B1 | * | 3/2003 | Arledge et al. ............. 358/1.15 |
| 6,668,046 | B1 | * | 12/2003 | Albal ............................. 379/119 |
| 6,721,405 | B1 | * | 4/2004 | Nolting et al. ................ 379/133 |

OTHER PUBLICATIONS

*Information processing systems—Open Systems Interconnection—Basic Reference Model*; Oct. 15, 1984; International Organization for Standardization.

Mills, D.L.; *Network Time Protocol (NTP)*; Sep. 1985; Network Working Group.

Kantor, Brian et al.; *Network News Transfer Protocol: A Proposed Standard for the Stream-Based Transmission of News*; Feb. 1986; Network Working Group.

*Information processing systems—Open Systems Interconnection—Specification of Basic Encoding Rules for Abstract Syntax Notation One (ASN.1)*; Nov. 15, 1987; International Organization for Standardization.

Horton, M. et al.; *Standard for Interchange of USENET Messages*; Dec. 1987; Network Working Group.

Wolf, Misha et al.; *Date and Time Formats*; Sep. 15, 1997; World Wide Web Consortium.

Mills, C. et al.; *Internet Accounting: Background*; Nov. 1991; Network Working Group.

Rivest, R.; *The MD5 Message-Digest Algorithm*; Apr. 1992; Network Working Group.

Braden, R. et al.; *Integrated Services in the Internet Architecture: an Overview*; Jun. 1994; Network Working Group.

Berners-Lee, T. et al.; *Hypertext Markup Language—2.0*; Nov. 1995; Network Working Group.

Fielding, R. et al.; *Hypertext Transfer Protocol—HTTP/1.1*; Jan. 1997; Network Working Group.

Roeck, G.; *ISDN Management Information Base using SMIv2*; Mar. 1997; Network Working Group.

Shenker, S. et al.; *Specification of Guaranteed Quality of Service*; Sep. 1997; Network Working Group.

Aboba, B. et al.; *Review of Roaming Implementations*; Sep. 1997; Network Working Group.

Braden, R. et al.; *Resource ReSerVation Protocol (RSVP)—Version 1 Functional Specification*; Sep. 1997; Network Working Group.

Baker, F. et al.; *RSVP Management Information Base using SMIv2*; Sep. 1997; Network Working Group.

Stiller, Burkhard et al.; *Pre-study on Customer Care, Accounting, Charging, Billing, and Pricing*; Feb. 18, 1998; Institut für Technische Informatik und Kommunikationsnetze TIK, ETH Zürich.

Bray, Tim et al. (Eds.); *Extensible Markup Language (XML) 1.0*; Feb. 10, 1998; World Wide Web Consortium.

Frankhauser, George et al.; *Reservation-based Charging in an Integrated Services Network*; Computer Engineering and Networks Laboratory, ETH Zürich.

Dawson, F. et al.; *Internet Calendering and Scheduling Core Object Specification (iCalendar)*; Nov. 1998; Network Working Group.

*Telecommunications and Internet Protocol Harmonization Over Networks (TIPHON); Inter-domain pricing, authorization, and usage exchange*; Dec. 1998; European Telecommunications Standards Institute.

*Specification of TMN applications at the Q3 interface: Call detail recording*; Jun. 1998; Telecommunication Standardization Sector, International Telecommunication Union.

* cited by examiner

BILLING MANAGEMENT PACKAGE FOR INTERNET ACCESS AND WEB PAGE UTILIZATION

CROSS REFERENCE TO THE RELATED APPLICATION

This application is a continuation-in-part of International Application No. PCT/US99/00577, filed Mar. 17, 1999.

BACKGROUND OF THE INVENTION

1. Field of the Invention

The present invention relates to a business billing management process or package intended for charging for Internet access on a "pay-as-you-go" basis. More specifically, the billing package (or modules) captures all web-based transactions involving browsing pages for content or purchasing materials and/or products on the Internet. This pay-as-you-go handling is based on both a time period in cyberspace for viewing and the materials and/or products selected for download to the users chosen device.

2. Description of the Related Art

Access into the Internet and user usage of domains and web sites by any means are currently free from any toll charges. Methods and systems for ordering merchandise from a remote terminal, as well as devices and systems for handling associated monetary transactions on the Internet and other communications networks, are known.

The prior art methods and systems for ordering merchandise from a remote terminal have focused on paying for only the goods ordered on line. For example, U.S. Pat. No. 4,734,858 issued on Mar. 29, 1988 to Schlafly, as well as WIPO Patent Document No. WO 85/02700 issued on Jun. 20, 1985, are directed to a pocket size data terminal and system for placing orders telephonically via a local processing center (LPC). Orders for goods or services are accumulated in the terminal and sent to the local processing center (LPC) in a short burst. A personal identification code is used for security.

U.S. Pat. No. 4,984,155, issued on Jan. 8, 1991 to Geier et al., discusses a data terminal for ordering goods or services from a supplier. The terminal is part of an order entry system having catalog assistance, and is primarily used for product selection, inventory checking and ordering assistance.

U.S. Pat. No. 5,515,268, issued on May 7, 1996 to Yoda, discloses a method and system for ordering products. A sensor detects a customer's size and a local computer system provides this sizing information to a remote computer system. The remote system provides fitting, availability and inventory information back to the local computer system.

U.S. Pat. No. 5,528,490, issued on Jun. 18, 1996 to Hill, outlines an electronic catalog system and method. This invention deals primarily with availability, data updating and security (determining pirated accessing software).

U.S. Pat. No. 5,664,110, issued on Sep. 2, 1997 to Green et al., discloses a remote ordering system that allows a users to construct one or more order lists in a local device (computer). The local device queries a remote device for updating, while still maintaining a user readable local order list.

U.S. Pat. No. 5,745,681, issued on Apr. 28, 1998 to Levine et al., teaches the concept of a stateless shopping cart for the web. This invention deals mainly with displaying and selecting products or services via "shopping cart fields" and "shopping page files" that are managed at the client's station Devices and systems for handling monetary transactions on the Internet and other communications networks, have been the subject of prior patents.

U.S. Pat. No. 5,475,585, issued on Dec. 12, 1995 to Bush, discloses a transactional processing system which allows for real-time authorization of payments for a plurality of products and services made available to individual computerized subscribers by a transmitting source ("a cable, telephone company, microwave, TVRO or DBS operator"). This system handles product or service selection, multiple vendors, billing, inventory checking and security using an electrically erasable Subscriber ID.

U.S. Pat. No. 5,508,913, issued on Apr. 16, 1996 to Yamamoto et al., describes an electronic dealing system which performs foreign exchange transactions among banks and/or brokers by matching terms of sale and terms of purchase.

U.S. Pat. No. 5,692,132, issued on Nov. 25, 1997 to Hogan, describes a system and method for conducting cashless transactions on a computer network such as the Internet. The invention deals primarily with monetary transactions, specifically in the form of various methods of extending credit over the Internet without the use of a central computer.

U.S. Pat. No. 5,727,163, issued on Mar. 10, 1998 to Bezos involves a secure method for communicating credit card data when placing an order on a non-secure network. The method uses a sub-set of the credit card number as a verification code.

None of the above inventions and patents, taken either singularly or in combination, is seen to describe the instant invention as claimed. The prior art systems fail to provide a complete billing management package. That is, one that can handle all aspects of Internet access toll charges, billing for time spent (pay-as-you-go) in cyberspace (or a specific domain). Thus a billing management package for charging for Internet access and web page utilization solving the aforementioned problems is desired.

SUMMARY OF THE INVENTION

The present invention is a software package, which handles all web-based access as chargeable transactions on a pay-as-you-go basis for browsing and purchasing products, services, and/or data on the Internet. The present invention provides a complete billing management package. That is, one that can handle all aspects of Internet access toll charges. These include billing for time spent (pay-as-you-go) in cyberspace (or a specific domain). Preferably, the charges would include guest and member registration; access to global web pages; commercial and/or private content and product selection and/or selected pages downloaded; broker charges for multiple (domain) product selections; voice access telephony software, CTI (computer telephony integration), VOIP (voice over IP); multi-lingual transactions, multi-currency transactions (monetary exchange and tax withholdings) and security. The software is designed to be loaded on an individual web or web server for front ending of multiple domains and/or access to other domains through Internet servers. In this way, the package has access to as many already written applications (open standards) as possible for the transfer of data or voice (convergence). This access allows the software to deal with access to web pages, content viewing and product selection, and billing the user for time spent browsing the web pages or pages downloaded, and acting as a broker for multiple domain product selections. The billing software package includes several 'modules", each of which handles different access transactions for browsing and purchasing on the Internet.

By combining all of the access functions required into a single billing management package, the present invention maximizes the effectiveness of recognized Internet vendor systems and shoppers alike.

The access module handles persistent state (user connection/reconnection to the server); a web domain database (initial and local) for user records and commerce records (including individual web site products bought, commerce site products viewed, time to date (mall favorites and knowledge site favorites list(s)), membership discounts and specials (customized); spending/spent by both banking and direct debit (customized).

The access module also handles global Internet functions such as digital or other ID verification systems (certificate), X-500 and other directory services, VPN (Virtual Private Network) cost routing, security through firewall, PKI (Public Key Interface) encryption and other access services.

The database module handles all relevant contact and billing information on the user, including individual web site products bought, commerce site products viewed, time used to date (mall favorites and knowledge site favorites list(s) most frequently used), membership discounts and specials (customized), such as for example Sam's club; spending/spent by both banking and direct debit (customized), for example Quicken.

The billing module handles time and/or products or pages within domain or multi-domains, including database records detailing archive and retrieval, merchant interaction by time and/or product, and ordering product(s); filter words and primary keys VOIP (voice over IP) ordering product, VOIP general telephone/fax calls, catalog browse/order and downloading for later viewing; and bank accounts, credit cards, credit/debit ratings, tax and foreign exchange (payment controls such as [example] SET, SSL, Cybercash, or Digicash), invoice, copy and records control, shipping control and fax or e-mail confirmation.

The API (Application Programming Interface) modules are built-in wizards, utilizing a shared repository operating communications as in handling all interacting and management of: synchronization of data anytime, anywhere on a standards based environment that allows any network computer, PC or other client device to interact with any application or data server over any network; allowing bi-directional replication; continuous support over a variety of standard networks, including cellular digital, packet radio, dial-up and local area network connections and is optimized to be used now and is seamlessly adaptable to new technologies.

Accordingly, it is a principal object of the invention to provide a billing management package that handles all charges for all access methods to the Internet, for example, by ASP/ISP, website or domain.

It is a further object of the invention to provide billing based on time in cyber-space used for browsing (real time), pages downloaded (later viewing) and purchasing material(s) and/or product(s) or service(s) on the Internet.

It is another object of the invention to provide a billing package that can handle multi-cash transactions as well as multi-currency transactions, including taxation charges specific to country, state or per item tax.

It is another object of the invention to provide a billing package that can handle multi-language transactions for translation into chosen language.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
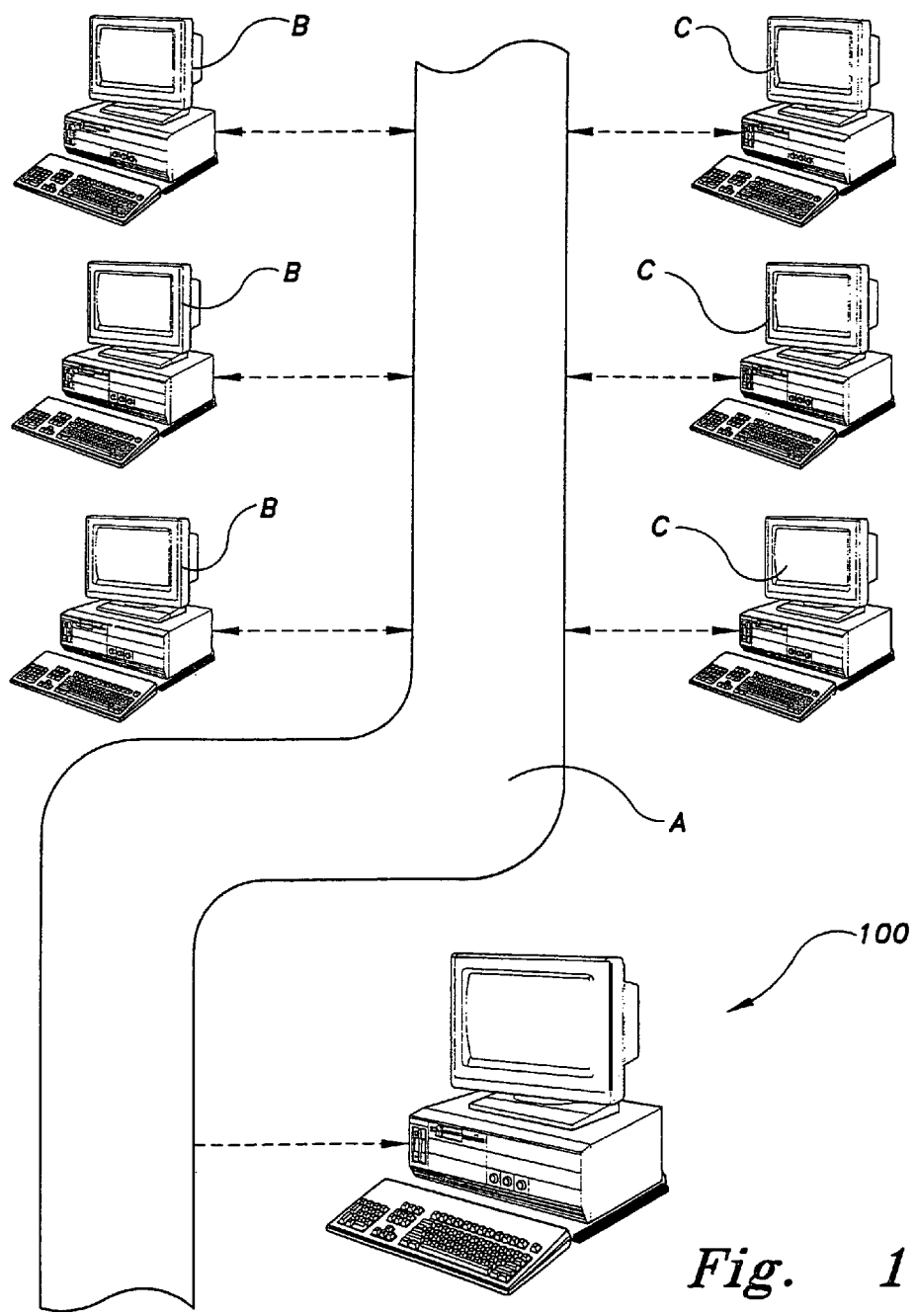
FIG. 1 is a schematic view showing the interconnection (via the world wide web) between the system of the present invention, the various customers using the system and the supplying vendors.

The present invention is a billing management software package, which handles all web-based access as transactions for browsing and purchasing material(s) and/or product(s) or service(s) on the Internet. The billing is based on time in cyber-space and/or material/product(s) selected for download. In FIG. 1, a representative schematic view is shown of: the world wide web A; the "system" of the present invention; the various web sites of supplying vendors or service providers B; the various customers C; and the interconnections there between. It should be noted that the different systems are shown as PCs simply to be representative, and that the business computers B would most likely be mainframe or internal networks themselves. To insure global reach and utilization the computer software used in the present invention is designed to be loaded on a web server for front ending of multiple domains and/or access to other domains through Internet or for an individual web (domain).

The software package of the present invention is designed to utilize as many already written (open standards) applications as possible, being able to utilize API for the bi-directional transfer of bit-stream and allow the software to deal with access to web pages, content viewing and product selection, billing the user for access time spent within (browsing) the web pages or for pages downloaded, and acting as a broker for multiple product selections by managing conduct of a simplified transaction for the user. While the software can be written in any language, the present code of the open software program is in Java, with later porting to Active X and Visual Basic possible. While initially intended to be in English/American, language software modules for Spanish and other primary languages are proposed. The billing software package includes several modules, each of which handles different transactions for browsing and purchasing on the Internet.

A user enters the software from an initial domain, and non-members are routed to a guest register where they are initiated into the system. After registering and selecting a web, the user then enters terms or words to search for desired products, services, and/or data. Found products, services, and data are downloaded and the user browses through the downloaded products. While browsing, the user can process orders and select different domains. Once the order is compiled, catalog processing is handled for the different items. Should the user wish to continue in another mall, they are rerouted to browse. As long as the user continues to browse, the billing module updates the records to indicate elapsed time by online timing, or alternatively the number of pages downloaded. After the user is finished, the billing module then handles payment processing. Product or multiple products are collected as one debit from the user, but handling of credits for each supplier is done separately. Membership in a particular domain may entitle the user to reduced costs or discounts or other promotions. After all of the above is considered, shipping is confirmed, the user is debited, and the vendors are credited. The user's records are then updated, time or page count is deducted, and any member credits are given.

The access module is responsible for maintaining 'state' (user connection/reconnection to the server); a web domain database (initial and local) for user records and commerce records, including individual site products bought, commerce site products viewed, time to date (mall favorites) list, membership discounts and specials (customized) and spending/spent by both banking and direct debit (customized). The access module also handles global Internet functions such as digital or other ID verification systems, X-500 and other directory services, VPN (Virtual Private Network) cost routing, firewall and other access services.

The billing module is responsible for time, and/or products within domain or multidomains (database records including archive and retrieval, merchant interaction by time and/or product, and ordering product); pages downloaded; filter words and primary keys (VOIP ordering product, VOIP general telephone/fax calls, catalog browse/order and downloading for later viewing). The billing module also handles bank account systems, credit cards, credit/debit ratings, tax and foreign exchange (payment controls, such as for example, SET, SSL, Cybercash or Digicash etc., invoice copy records control, shipping control and fax and or email confirmation).

The payment module is responsible for billing credit/debit transactions and includes multicash transactions as well as multi-currency transactions which are updated and confirmed by accessing web sites for conversion rates. Product or multiple products or service offerings are collected as one debit from the user, but handling of credits, wires, fax calls, etc. for each supplier is done separately. Membership in a particular website/domain may entitle the user to reduced costs or discounts, or other promotional offerings. After all of the above is qualified, if required, shipping is confirmed, the user is debited, and the vendors are credited. If a certain time or monetary limit (lock) has been introduced, (by the user or a creditor) an applied % output may be provided.

Figure 2:
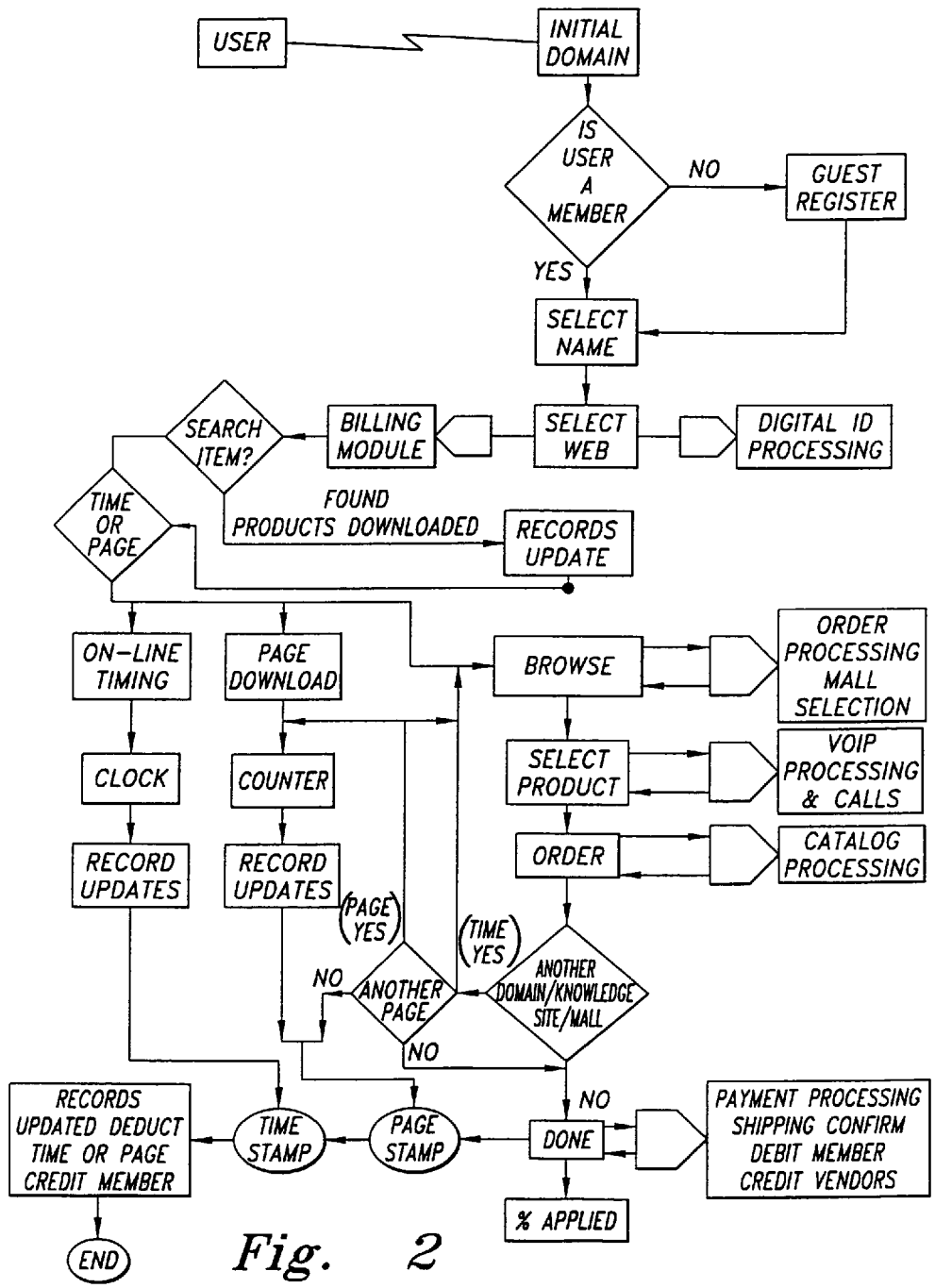
FIG. 2 is a flow chart depicting the steps used by a customer while using the present invention.

FIG. 2 is a flow chart illustrating the steps taken by a user operating within the billing management software package of the present invention. At the top of the flowchart the user enters the software from an initial domain, and is asked if they are a member. Nonmembers are routed to a guest register where they are initiated into the system. The membership process preferably requires a form of positive user/password identification of the individual, such as, a biometric reading clearly establishes that the user is truly the individual stated. Biometric foundations would include voice sounding, fingerprint imaging, or video imaging, such as by utilizing retina scan, facial scan, or similar methods.

Members and non-members then select their name (generated in the guest register) and initial domain/website. Upon selecting a web, the user's ID is checked by the billing module. Security for the software package including ID checks can be provided using for example PGP (Pretty Good Privacy) shareware, trusted sites, such as for example, Microsoft 128 key encryption code and, for example, Verisign programming for credit authority. The user then enters words and/or other terms to search for desired products, services, and data.

As found, the selected products, services, and data are downloaded (records updated), the user has a choice of access transaction, time billing or per page billing. The transmission of data is dependent upon throughput. Where the user has fast access and reliable throughput, the time billing option is generally preferred. If the user has poor access and unreliable throughput, per page billing is generally preferred.

As the user browses through the downloaded products, online timing is activated for time billing. This operates with a clock to be set at a per minute/second counting depending on the instruction received from the browsed web site.

Per page billing operates with a page counter. The page counter is set at each complete page downloaded from the instruction received from the browsed site. The page counter may be incremented in various ways, such as returning a byte count to the user's home domain. The cost per page is in U.S. dollars (set as default), or other currency set by the browsed web site.

While browsing, the user can process orders and select different shops/malls (interactive domains) or knowledge sites (domains). Knowledge sites, for example, may be sites acting as repositories for published works, technical works, intellectual works, research and library works or chat rooms or gaming arenas.

VOIP processing and other voice and fax calls are handled for associated selected products or services. Once the order is compiled, catalog processing is handled for the different items. Should the user wish to continue in another website/domain, they are rerouted to browse. As long as the user continues to browse, the clock or page counter updates the records. For example, elapsed time may be indicated in one minute or one second blocks. After the user completes browsing or products selection, the timing or page counting is halted and final processing begins.

Prior to exiting the program, the user's records are updated, a billing stamp is recorded (time or page stamp), time or page is deducted according to the billing stamp, and any member credits are given. As with the products, time or page billing may be reduced for members of certain domains, as the billing is accrued as time in each domain or pages downloaded. In addition, buying products and/or services may accrue credit to the user in terms of free or reduced cost time or pages in the program.

It is to be understood that the present invention is not limited to the embodiments described above, but encompasses any and all embodiments within the scope of the following claims.

What I claim is:

1. A method of operating a billing management package for charged access transactions on the Internet, said method comprising the steps of:
    querying a user to select at least one desired domain and/or specific web site, wherein the at least one desired domain and/or specific web site are located on a web server operating the billing management;
    querying the user to enter terms for at least one desired product, service, and/or data;
    using a computer to search the at least one desired domain and/or specific web site for the desired product, service, and/or data;
    querying a user to select a billing access option, the billing option being selected from a group consisting of time billing and per page billing;
    downloading at least one found desired product, service, and/or data;
    updating, by the web server, user records based on the at least one downloaded desired product, service, and/or data;
    ceasing billing upon an indication by the user and recording a billing stamp, wherein the billing stamp indicates a duration of time if the selected billing option is time billing or a number of downloaded pages of desired product, service, and/or data if the selected billing option is per page billing;
    determining, by the web server, a billing amount based on the billing stamp;

debiting the user's account the billing amount and crediting at least one vendor based on the downloaded desired product, service, and/or data.

2. The method of operating a billing package according to claim 1, wherein the selected billing option is time billing and the billing stamp indicates elapsed time in blocks, the blocks being selected from a group consisting of one minute blocks and one second blocks.

3. The method of operating a billing package according to claim 1, wherein the selected billing option is per page billing and the billing stamp includes a page counter indicating a number of web pages accessed by the user.

4. The method of operating a billing package according to claim 1, wherein said step of crediting the at least one vendor includes converting multi-currency transactions by accessing web sites for up to date conversion rates.

5. The method of operating a billing package according to claim 1, comprising updating the user records in accordance with a tax billing option, noting the rate or percentage charged and if sub-divisions also applicable to material(s) and/or product(s) or service(s) within each domain.

6. The method of operating a billing package according to claim 1, wherein the user selects a combination of at least two desired domain and/or specific web site.

7. The method of operating a billing package according to claim 1, further comprising processing any voice and/or fax calls for desired product, service, and/or data.

8. The method of operating a billing package according to claim 1, wherein crediting the at least one vendor includes converting multi-currency transactions, tax debiting, collecting multiple transactions as one debit from the user, handling credits, wires, fax calls, e-mails and other services and products for each vendor separately.

9. The method of operating a billing package according to claim 1, wherein determining the billing amount further comprises applying discounts to the billing amount due to user membership in the selected at least one domain and/or specific website from which the user accrued charges.

10. The method of operating a billing package according to claim 9, wherein determining the billing amount further comprises:
checking each domain and/or specific web site the user had time elapsed within and any membership with the domain visited and/or specific web site;
checking desired products, services, and/or data for credit the user is entitled to in terms of free and/or reduced time; and
updating the user records to reflect the user credits earned through membership and/or by selection of promoted products, services, and/or data.

11. The method of operating a billing package according to claim 1, further comprising, prior to querying the user to select the at least one desired domain and/or specific web site:
querying the user for a user name and at least one password and/or biometrics qualification; and
determining the accuracy of the user name and at least one password and/or biometrics qualification.

12. The method of operating a billing package according to claim 11, wherein
determining the accuracy of the user name and the at least one password and/or biometrics qualification further comprises accessing trusted sites, and processing digital IDs.

13. The method of operating a billing package according to claim 1, further comprising, prior to querying the user to select the at least one desired domain and/or specific web site, querying the user to indicate a member status or a non-member status, wherein if the user indicates non-member status, routing the user to a guest register.

14. The method of operating a billing package according to claim 13, wherein:
routing the a user to the guest register includes establishing a form of positive identification of the user, said form of positive identification being selected from a biometrics group consisting of voice sounding, fingerprint imaging, and video imaging.

15. The method of operating a billing package according to claim 13, wherein said method further comprises the step of:
if member status is indicated downloading member information including individual site products bought, commerce site products viewed, a domain mall favorites list, customized membership discounts and specials and customized spending listed by banking and direct debit.

16. The method of operating a billing package according to claim 14, wherein the form of positive identification is video imaging, wherein and the video imaging is selected from a group consisting of retina scans and facial scans.

17. The method of operating a billing package according to claim 1, further comprising, prior to ceasing billing upon the indication by the user, catalog processing and compiling orders for the desired product, service, and/or data.

18. The method of operating a billing package according to claim 17, wherein said catalog processing and compiling orders for each the desired product, service, and/or data further comprises downloading chosen information for later viewing by the user.

19. The method of operating a billing package according to claim 1, further comprising crediting each vendor separately.

20. A server hosting a website accessible by a computer over the Internet, the server configured to operate a billing management module for charging a user of the computer for at least one selected product, service, and/or data, the server comprising:
a web server;
the billing management module comprising:
an access module configured to accept a connection from the computer, wherein the access module is configured to receive a query from the computer and provide a query result to the computer comprising at least one product, service, and/or data;
a database module including user information, wherein the user information includes billing information;
wherein the billing management module is configured to:
query a user to select a billing option from a group consisting of time billing and per page billing;
receive a selected billing option;
receive at least one selected product, service, and/or data from the computer;
provide the user the at least one selected product, service, and/or data;
update the user information based on the at least one selected product, service, and/or data;
receive a stop billing indication from the computer;
generate a billing stamp, wherein the billing stamp indicates a duration of time if the selected billing option is time billing or a number pages of provided product, service, and/or data if the selected billing option is per page billing;
determine a billing amount based on the billing stamp;
debit an account of the user for the billing amount; and
crediting at least one vendor a portion of the billing amount based on the provided product, service, and/or data.

21. A server hosting a website accessible by a computer over the Internet, the server configured to operate a billing management module for charging a user of the computer for at least two selected product, service, and/or data, the server comprising:
 a web server;
 the billing management module comprising:
  an access module configured to accept a connection from the computer, wherein the access module is configured to receive a query from the computer and provide a query result to the computer comprising at least one product, service, and/or data;
  a database module including user information, wherein the user information includes billing information;
 wherein the billing management module is configured to:
  query a user to select a billing option from a group consisting of time billing and per page billing;
  receive a selected billing option;
  receive the at least two selected product, service, and/or data from the computer, wherein a price associated with a first selected product, service, and/or data is in a different currency than a price associated with a second selected product, service, and/or data;
  provide the user the at least one selected product, service, and/or data;
  update the user information based on the at least one selected product, service, and/or data;
  receive a stop billing indication from the computer;
  generate a billing stamp, wherein the billing stamp indicates a duration of time if the selected billing option is time billing or a number pages of provided product, service, and/or data if the selected billing option is per page billing;
  determine a billing amount in a single currency based on the billing stamp, wherein a first portion of the billing amount associated with a first provided product, service, and/or data is in a different currency than a second portion of the billing amount associated with a second provided product, service, and/or data;
  debit an account of the user for the billing amount; and
  crediting at least one vendor a portion of the billing amount based on the provided product, service, and/or data.

22. The server of claim 21, wherein the billing amount includes tax for at least one of the provided product, service, and/or data.

* * * * *